Dec. 4, 1956  J. J. BYRNES  2,772,804
MAGNETIC STOPPER
Filed Aug. 16, 1954.  2 Sheets-Sheet 1

JOHN J. BYRNES,
INVENTOR

BY
ATTORNEYS

Dec. 4, 1956  J. J. BYRNES  2,772,804
MAGNETIC STOPPER

Filed Aug. 16, 1954  2 Sheets-Sheet 2

JOHN J. BYRNES,
INVENTOR

BY  ATTORNEYS

United States Patent Office 2,772,804
Patented Dec. 4, 1956

2,772,804

MAGNETIC STOPPER

John J. Byrnes, Newark, N. J.

Application August 16, 1954, Serial No. 449,827

6 Claims. (Cl. 220—24)

This invention relates to devices for stopping the flow of oil or other fluid from holes or openings in metal tanks, pipes and other containers or conductors; and it relates more particularly to a flow stopping device in which magnetic force is used to hold a stopper against a hole in a tank or against the end of a pipe.

The invention is especially useful to oil burner service men who must at times stop leaks from fuel oil tanks due to small holes eaten in them by corrosion and at times stop the back flow of oil when the oil line is disconnected from the oil burner while repairing or exchanging fuel pumps or fuel units.

The device comprises a pair of laterally spaced permanent magnets adapted to adhere to the surface of a steel or iron tank and connected by a resilient member which carries a screw or other adjustable element to force a stopper element against the hole or other opening in the tank. When the device is to be used to close the end of a fuel oil line or pipe, the magnets adhere to a steel plate with a notch to receive the pipe beneath its flared end so that the stopper will be thrust against the open end of the pipe and its flared or flanged end.

The object of the invention is to provide a magnetic stopper of this character which is simple and inexpensive in construction, easy to apply and remove, and effective in accomplishing its intended uses.

With the above and other objects and advantages in view, the invention resides in the novel combinations and arrangements of parts and the novel features of construction hereinafter described and claimed, and illustrated in the accompanying drawings which show the present preferred embodiment of the invention.

Figure 4:
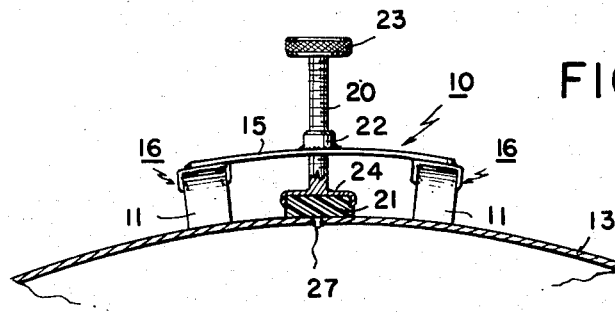
Fig. 4 is a detail sectional view through a portion of a tank wall showing the device in use thereon.
Figure 5:
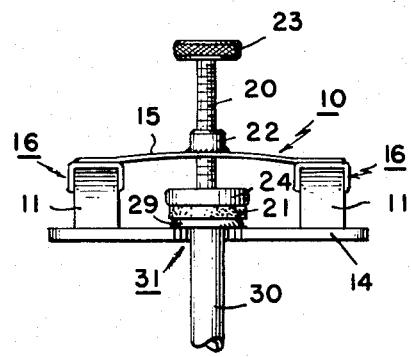
Fig. 5 is a detail view showing the device applied to the end of a flared pipe.
Figure 6:
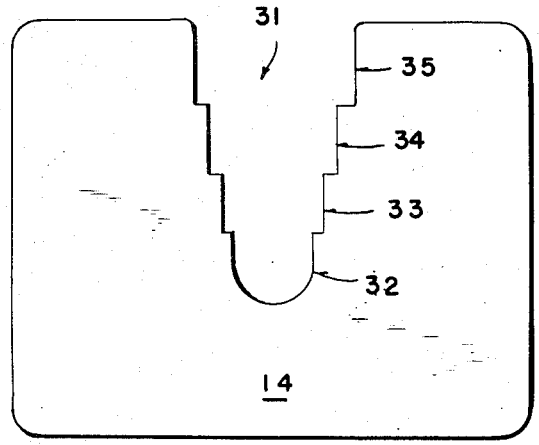
Fig. 6 is a plan view of the steel plate used in Fig. 5.

Referring more in detail to the drawings, the numeral 10 denotes the magnetic stopper as a whole. It comprises two similar "Alnico" magnets 11 which are substantially U-shape and have pole members with flat faces 12 to engage the wall of a steel tank 13 as seen in Fig. 4 or a flat steel plate 14 as shown in Figs. 5 and 6. These permanent magnets 11 are held in laterally spaced parallel relation by a resilient connecting element 15 preferably in the form of a flexible rectangular strip of spring steel. The ends of this resilient strip may be soldered or otherwise fixed to the central portion of the magnets but as shown they are fastened to the tops of U-shaped metal clips 16 which straddle the top portions of the magnets. The latter have flat side faces formed with channels or recesses 17 and the extremities of the arms 18 of the clips are sprung into or clinched in the recesses 17 as shown at 19.

Figure 1:
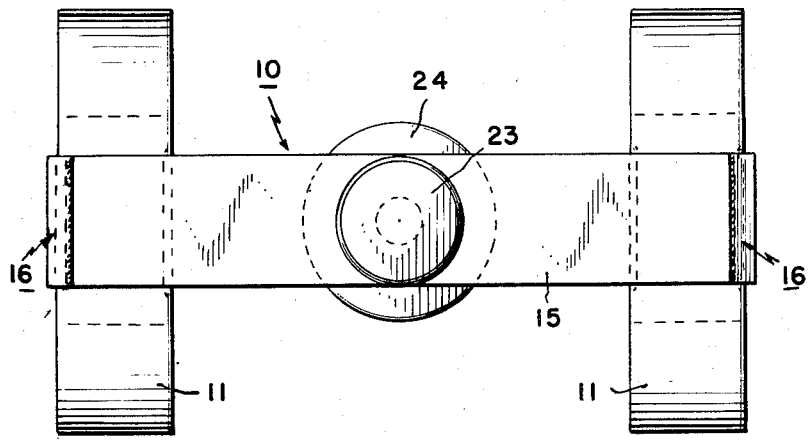
Fig. 1 is a side elevation of the device on an enlarged scale.
Figure 2:
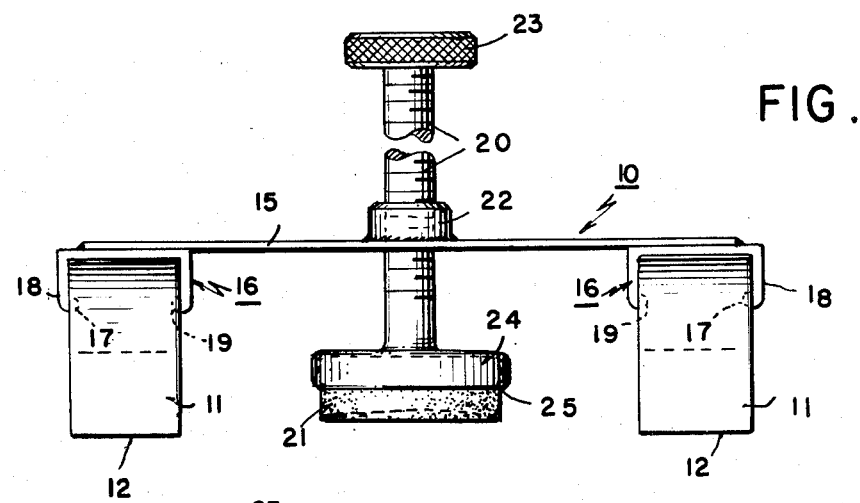
Fig. 2 is a top plan view.
Figure 3:
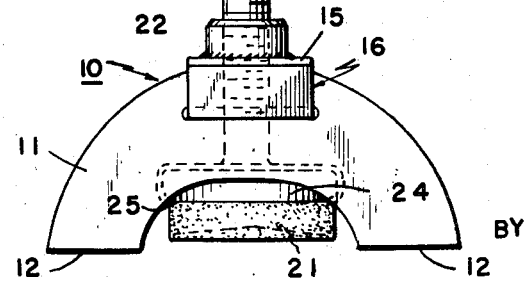
Fig. 3 is an end elevation.

The resilient element 15 carries at its center an adjustable member 20 for forcing a closure or stopper 21 against a hole in a tank wall or against the end of a pipe. The member 20 is preferably screw threaded through a nut in the form of a boss 22 soldered over an opening at the center of the strip 15. A knurled head or other finger piece 23 is fixed to the outer end of the screw 20, and the stopper or closure member 21 is preferably carried by the inner end of the latter. The stopper may be a disk of neoprene or other suitable compressible or elastic material partially seated in a metal reenforcing cup 24 and clinched therein as at 25. While the stopper may be swiveled to the inner end of the screw it is preferably fixed thereto by soldering the metal cup on the end of the screw. The exposed face of the neoprene disk 21 is preferably concave as indicated in Fig. 2.

When the device is to be used to seal a hole in a fuel oil tank as shown in Fig. 4, the two magnets are seated on the tank wall 13 on opposite sides of the hole 27 with the stopper disk centered over the hole. The screw is then rotated to force the neoprene disk against the wall to compress it over the hole and stop the escape of oil. The magnets will firmly adhere to the tank and when pressure is applied by the screw the resilient strip will bow slightly. The holes usually occur in the bottom or lower portions of a tank and hence Fig. 4 may be considered as an inverted view; but it shows one possible application of the device. Since the holes in fuel oil tanks are small, the device need not be longer than two inches and the length of the magnets less than two inches, but for other uses the device may be made much larger and stronger.

When the device is to be used to close the flared end 29 of a fuel oil pipe 30, as shown in Fig. 5, the steel or other magnetic metal plate 14 shown in Fig. 6 must be used. This may be a cold rolled steel plate about one-sixteenth of an inch thick having a length slightly greater than the device and a width sufficient to permit its notch 31 to receive at least one size of pipe. However since fuel oil pipes have different diameters and it is desirable to use the one plate for all pipe sizes, the notch is made deep and its opposite walls are stepped as shown in Fig. 6. The notch thus has progressively wider portions 32, 33, 34 and 35 from its inner to its outer end in order that the plate may be centered on pipes of four different diameters. The portions of the plate on opposite sides of the stepped notch are of sufficient area so that the flat pole pieces of the two magnets may firmly adhere to it when the flexible strip 15 extends across any of the four different widths of the notch 31. When the end of a pipe is to be sealed, the plate is shifted laterally with respect to the pipe until the latter is in the portion of the notch intended to receive a pipe of its size, and the plate is then moved along the pipe until it is stopped by the flared end 29. The device is then applied to the plate across the pipe and the screw is turned to force the stopper against the flared portion.

It will be noted that the flexible strip 15 is an elongated and relatively thin metal strip so that it may bow longitudinally and flex laterally to a limited extent. It normally holds the flat pole faces of the two magnets in a single plane but at the same time permits the two magnets to shift slightly toward and from each other and to angle slightly with respect to each other so that the pole faces may adapt themselves to areas of magnetic metal which may not be in a single plane and which may be slightly curved or irregular in shape.

From the foregoing, taken in connection with the accompanying drawing, it will be seen that novel and advantageous provision has been made for carrying out the objects of the invention, and while preferences have been disclosed, attention is invited to the possibility of making variations within the scope of the invention as claimed.

I claim:

1. A device for stopping the flow of a fluid from holes or openings in metal tanks, pipes and other containers or conductors, comprising in combination two permanent magnets spaced laterally from each other and having flat pole faces, an elongated member having it ends fastened to the central portions of the magnets to normally hold the pole faces of the magnets in a single plane, said member being a strip of resilient sheet metal which may bow longitudinally and flex laterally, a nut at the center of said member and a stopper-actuating screw threaded through said nut.

2. The structure of claim 1 together with a compressible stopper disk carried by the end of said screw adjacent the pole faces of the magnets.

3. The structure of claim 1 in combination with a flat plate of magnetic metal having in one edge a notch to receive a pipe adjacent its flared end, the plate having flat areas on opposite sides of its notch for engagement by the flat pole faces of the magnets when the stopper actuating screw is in alinement with the pipe.

4. The structure of claim 3 in which the walls of the notch are stepped to progressively increase the width of the notch from its inner to its outer end for the purpose set forth.

5. The structure of claim 1 in which said magnets are U-shape and have at the central portions of their opposite side faces longitudinally extending channels, and inverted U-shaped metal clips straddling the central portions of said magnets and having depending arms with inturned extremities seated in said channels to fasten said clips to the magnets, the ends of said elongated member being fixed to said clips.

6. A device of the character described comprising two laterally spaced permanent magnets, a connecting member holding the magnets in spaced relation, a stopper, and an elongated stopper actuating element mounted on said member and adjustable lengthwise between the magnets, said magnets being substantially U-shaped and disposed in parallel relation with their pole faces flat and normally disposed in a single plane, in combination with a plate of magnetic material having in one edge a notch to receive a pipe adjacent its flared end, the plate having flat areas on opposite sides of its notch for engagement by the flat pole faces of the magnets, the walls of the notch being stepped to progressively increase the width of the notch from its inner to its outer end for the purpose set forth.

References Cited in the file of this patent

UNITED STATES PATENTS

| | | |
|---|---|---|
| 394,381 | Maxson | Dec. 11, 1888 |
| 667,333 | Pfugh | Feb. 5, 1901 |
| 2,580,099 | Jaeger | Dec. 25, 1951 |
| 2,589,349 | Diefenbach | Mar. 18, 1952 |
| 2,672,257 | Simmonds | Mar. 16, 1954 |